Oct. 10, 1967   E. H. DINGER   3,346,798
REGULATOR FOR INVERTER
Filed Aug. 8, 1963   4 Sheets-Sheet 1

INVENTOR.
EDWARD H. DINGER
BY James J. Williams
HIS ATTORNEY

Oct. 10, 1967   E. H. DINGER   3,346,798
REGULATOR FOR INVERTER
Filed Aug. 8, 1963
4 Sheets-Sheet 4

INVENTOR.
EDWARD H. DINGER
BY James G. Williams
HIS ATTORNEY

United States Patent Office 3,346,798
Patented Oct. 10, 1967

3,346,798
REGULATOR FOR INVERTER
Edward H. Dinger, Waynesboro, Va., assignor to General Electric Company, a corporation of New York
Filed Aug. 8, 1963, Ser. No. 300,876
3 Claims. (Cl. 321—18)

The invention relates to a regulator for an inverter. The invention relates particularly to a regulator that maintains the output voltage of an inverter at a predetermined amplitude and that limits the output current of an inverter within a predetermined magnitude.

Inverter circuits are utilized to convert direct current to alternating current. Many such inverter circuits are of the static type which utilize solid-state devices such as transistors as opposed to moving devices such as relays or vibrators.

An object of the invention is to improve static inverters.

The inverter may supply an alternating current load which is voltage sensitive. Therefore, it is desirable that the output voltage of the static inverter be regulated or maintained at a predetermined amplitude. If the inverter is a static inverter, it is desirable that the regulation or maintenance of the output voltage at the predetermined magnitude be achieved by static devices.

Accordingly, another object of the invention is to provide an improved regulator for static inverters.

Another object of the invention is to provide an improved static device of the magnetic type.

Another object of the invention is to provide an improved static voltage regulator that is particularly useful with static inverters.

The static inverter may include solid-state devices such as transistors which, if not protected within the inverter, may be subjected to damaging currents. Therefore, it is desirable that the output current supplied by the static inverter be limited or maintained below a predetermined magnitude.

Accordingly, another object of the invention is to provide an improved current regulator that is particularly useful with static inverters.

Briefly, these and other objects of the invention are achieved with an inverter wherein current control devices are switched between conducting and nonconducting states to convert a source of direct current to alaternating current that is to be supplied to a load. The regulator includes sensing means which are coupled to the inverter for sensing the voltage amplitude and current magnitude of the alternating current. One winding of a saturable reactor is coupled to the voltage sensing means and produces a switching signal at a time determined by the voltage amplitude of the alternating current and by the volt-second characteristics of the saturable reactor. This switching signal is coupled to the current control devices of the inverter and switches these devices between their conducting and nonconducting states at a time such that the voltage amplitude of the alternating current is maintained at the desired predetermined level. A second winding coupled to the saturable reactor is short circuited in response to current magnitudes which exceed a predetermined level. When the second winding is short circuited, the volt-second characteristics of the saturable reactor are reduced so that the switching signal switches the current control devices at a time such that the current magnitude of the alternating current is reduced to a low value or zero. Finally, the invention includes saturable reactor sensing means that have an inherent reference signal or saturation level.

The invention is particularly pointed out in the claims. The invention may be better understood from the following description given in connection with the accompanying drawing, in which:

Figure 1:
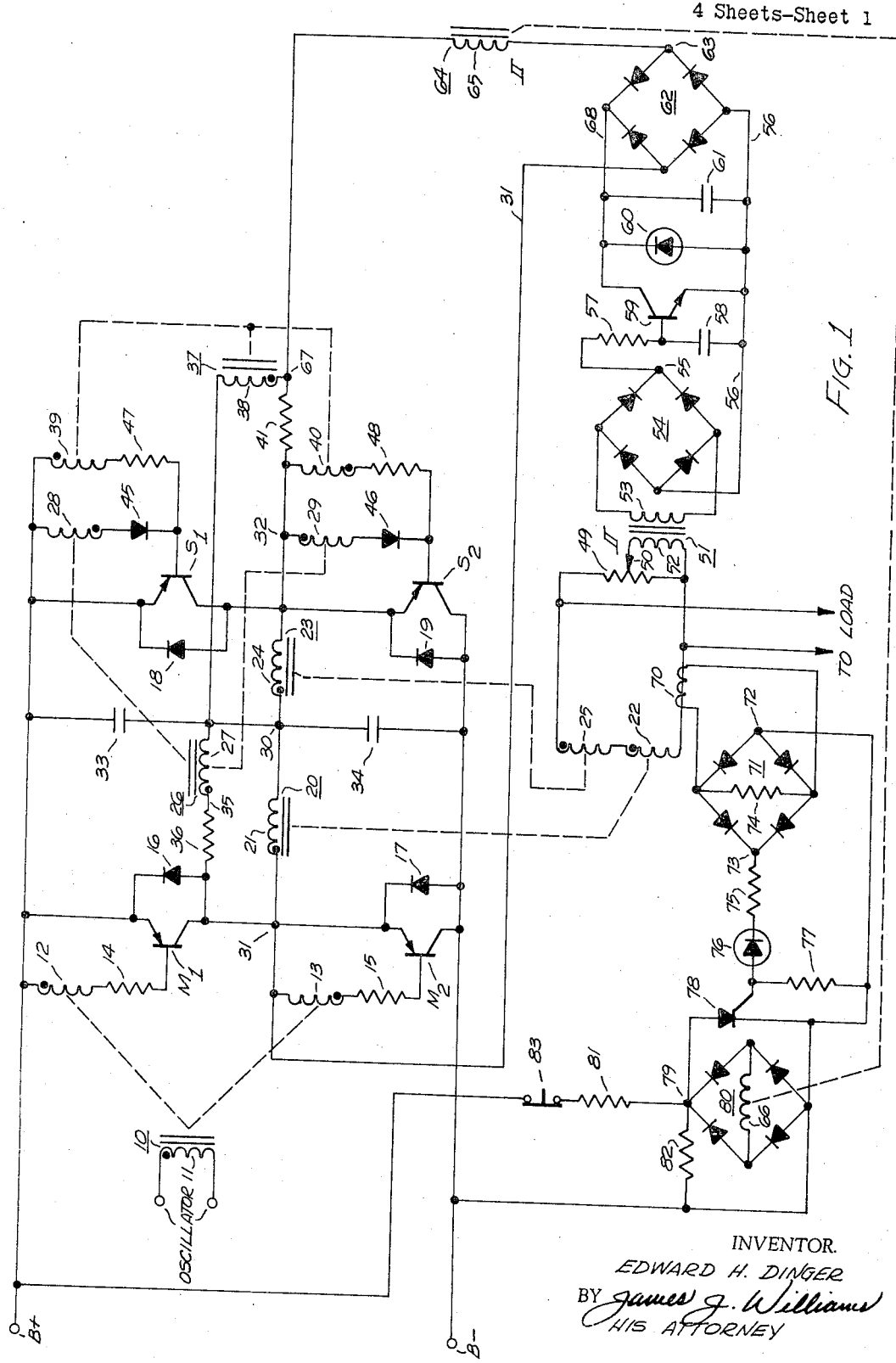
FIGURE 1 shows a schematic diagram of a preferred embodiment of a regulator in accordance with the invention.
Figure 3A:
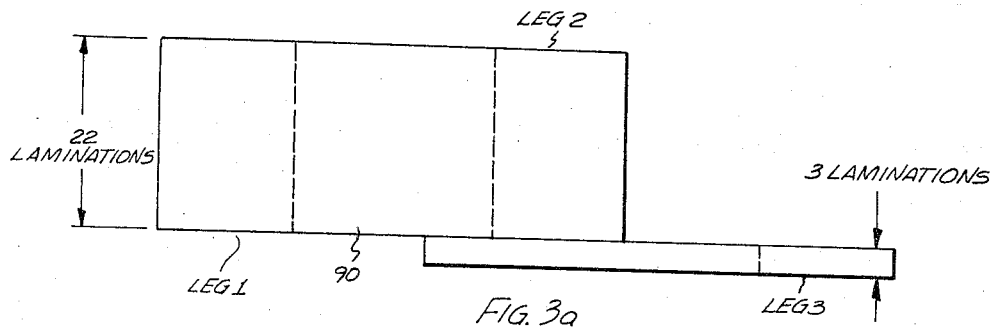
Figure 3B:
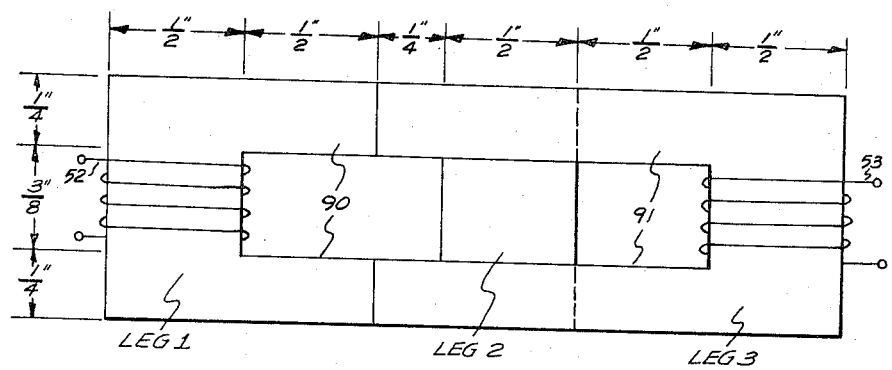
Figure 3C:
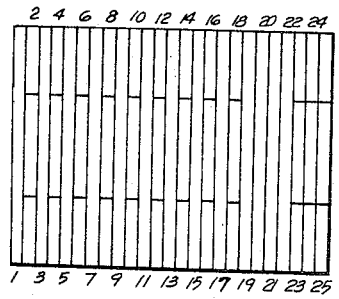
Figure 4:
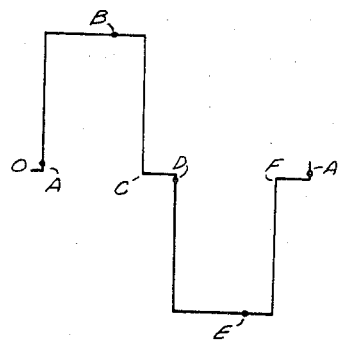
Figure 5:
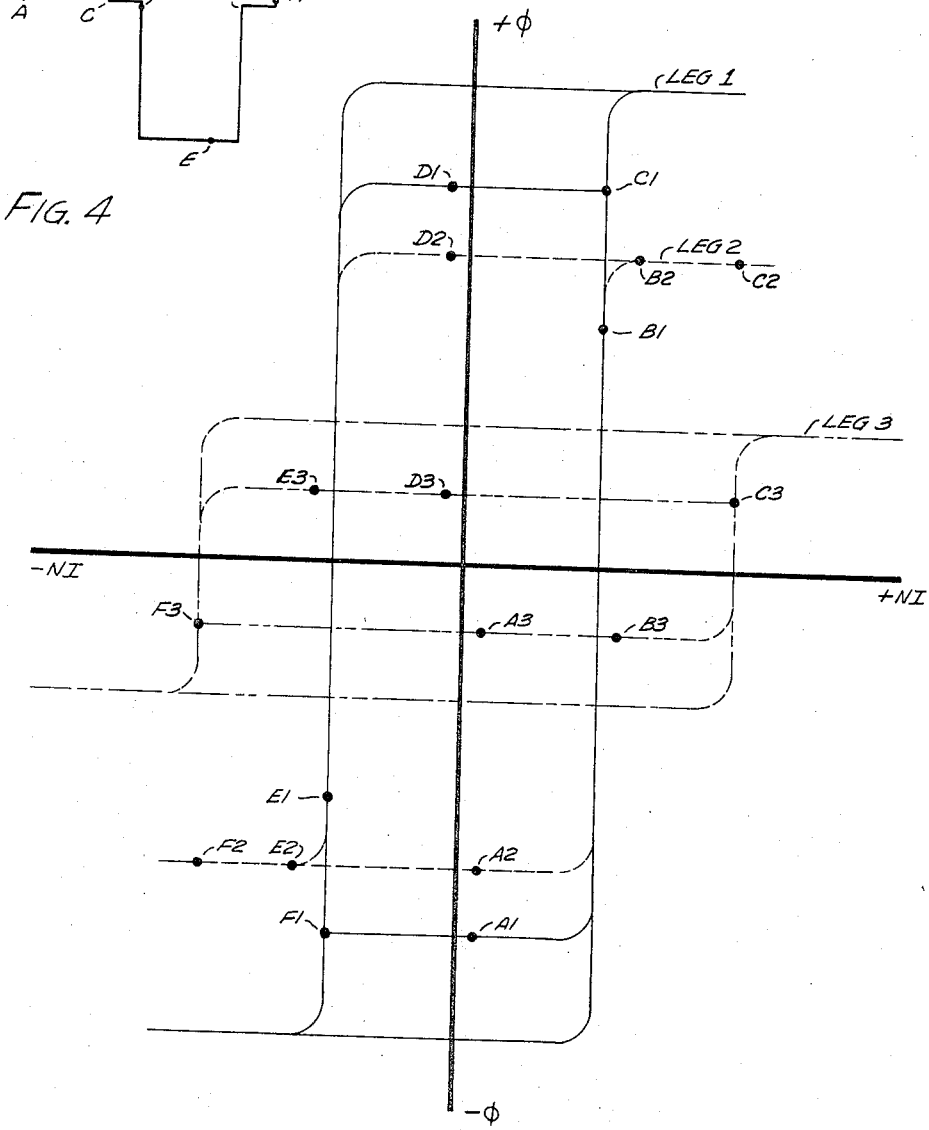

FIGURES 3a, 3b, and 3c show the arrangement and construction of a magnetic element in accordance with the invention and used in FIGURE 1; and FIGURES 4 and 5 show waveforms for explaining the operation of the magnetic element of FIGURES 3a, 3b, and 3c.

Regulator description

The regulator of the invention is particularly adaptable or useful with a static inverter. FIGURE 1 shows such a static inverter, this inverter being designed to change a sourcee of direct current supplied by terminals B+ and B— into a source of alternating current. Two capacitors 33, 34 are coupled in series between the terminals B+ and B— to provide an artificial mid-point or center bus 30 for the direct current voltage. The inverter comprises four solid-state current control devices or transistors M1, M2, S1, S2 of the PNP type. The designations M and S indicate master and slave. The master transistors M1, M2 are arranged so that they are in one state with the master transistor M1 conducting and the master transistor M2 nonconducting; or in an opposite state with the master transistor M1 nonconducting and the master transistor M2 conducting. The master transistors M1, M2 are switched between these two states by any suitable oscillator which is coupled to the primary winding 11 of an oscillator transformer 10. Secondary windings 12, 13 are coupled to the oscillator transformer 10 as indicated by the dashed lines. The secondary windings 12, 13 and the primary winding 11 are coupled together in accordance with the conventional polarity dots adjacent the respective windings. The polarity dots indicate the ends of the windings of a particular transformer that have the same voltage polarities at any moment in time. This convention is consistently used throughout in FIGURE 1. The transistors shown in FIGURE 1 are of the PNP and NPN types. These types may be changed if appropriate circuit polarities are provided.

The secondary windings 12, 13 and resistors 14, 15 are respectively coupled between the emitter and base electrodes of the master transistors M1, M2. The master transistors M1, M2 are switched between the two states at the frequency rate of the oscillator coupled to the primary winding 11 of the oscillator transformer 10. If the inverter is to provide 60-cycle alternating current, then the oscillator has a frequency of 60 cycles. As the oscillator signal changes polarity at this frequency rate, it causes the master transistor M1 to conduct and the master transistor M2 to be nonconducting, and then causes the master transistor M1 to be nonconducting and the master transistor M2 to conduct, and so forth. Specifically, when the dotted ends of the windings 11, 12, 13 are positive with respect to the undotted ends, the master transistor M1 is conducting and the master transistor M2 is nonconducting. When the undotted ends of the windings 11, 12, 13 are positive with respect to the dotted ends, the master transistor M2 is conducting and the master transistor M1 is nonconducting. The emitter of the master transistor M1 is coupled to the terminal B+, and the collector of the master transistor M1 is coupled to a center master bus 31. The emitter of the master transistor M2 is coupled to the center master bus 31, and the collector of the master transistor M2 is coupled to the terminal B—. Diode rectifiers 16, 17 are respectively coupled between the emitter and collector electrodes of the master transistors M1, M2 for permitting reverse current to flow around these transistors during certain parts of the switching cycle.

The slave transistors S1, S2 are coupled in a similar fashion between the terminals B+ and B— and a center slave bus 32. Diode rectifiers 18, 19 are respectively coupled between the emitter and collector electrodes of the slave transistors S1, S2. A voltage regulator transformer 37 having a primary winding 38 and two secondary windings 39, 40 coupled to each other as indicated by the polarity dots and the dashed lines is provided for switching the slave transistors S1, S2. One end of the primary winding 38 is coupled to the center bus 30 and the other end of the primary winding 38 is coupled to a point 67. A voltage regulator resistor 41 is coupled from the point 67 to the center slave bus 32. The secondary windings 39, 40 of the voltage regulator transformer 37 are respectively coupled in series with resistors 47, 48, and these series circuits are respectively coupled between the emitter and base electrodes of the slave transistors S1, S2. In operation, when the dotted end of the primary winding 38 of the voltage regulator transformer 37 is positive, the secondary winding 39 causes the slave transistor S1 to conduct and the secondary winding 40 causes the slave transistor S2 to be nonconducting. When the undotted end of the primary winding 38 is positive, this causes the slave transistor S1 to be nonconducting and the slave transistor S2 to conduct. The voltage regulator transformer 37 is supplied with signals at a time, in accordance with the invention, determined by the output voltage magnitude to switch the states of the slave transistors S1, S2. A pulse transformer 26, having a primary winding 27 and two secondary windings 28, 29 which are coupled together as indicated by the dashed lines and polarity dots, is also provided for switching the states of the slave transistors S1, S2. One end of the primary winding 27 of the pulse transformer 26 is coupled to the center bus 30. The other end of the primary winding 27 is coupled to a pulse resistor 36 at a pulse junction 35. The other end of the pulse resistor 36 is coupled to the center master bus 31. The secondary winding 28 is coupled in series with a diode rectifier 45 between the emitter and base electrodes of the slave transistor S1. The secondary winding 29 and a diode rectifier 46 are coupled between the emitter and base electrodes of the slave transistor S2. The slave transistors S1, S2 may also have their states switched by the pulse transformer 26 in a fashion similar to that described for the master transistors M1, M2.

The inverter produces alternating current (which is actually a square wave, or a quasi square wave). This alternating current is derived from output transformers 20, 23. The output transformer 20 has a primary winding 21 and a secondary winding 22 coupled together as indicated by the dashed lines and the polarity dots; and the output transformer 23 has a primary winding 24 and a secondary winding 25 coupled together as indicated by the dashed lines and the polarity dots. The windings of the output transformer 20 are not coupled magnetically to the windings of the output transformer 23. The primary winding 21 is coupled between the center master bus 31 and the center bus 30, and the primary winding 24 is coupled between the center bus 30 and the center slave bus 32. The secondary windings 22, 25 are coupled in series or voltage adding relationship. While not shown, there could be one or more additional power stages between the output transformers 20, 23 of the inverter shown and the load. Also, the two output transformers 20, 23 may be consolidated into a single transformer, with no connection between such a single transformer and the center bus 30. The output alternating current may or may not be filtered and then supplied to a load as indicated. The output alternating current (either filtered or not filtered) is also coupled to a voltage level potentiometer 49 which has a movable tap 50. The voltage level selected by the movable tap 50 is coupled to the primary winding 52 of a feedback saturable reactor 51. The secondary winding 53 of the feedback saturable reactor 51 is coupled to a full wave voltage feedback bridge 54 comprising four diode rectifiers. The output of this voltage feedback bridge 54 appears at the points 55, 56. A resistor 57 and capacitor 58 are coupled in series across this rectified output to provide filtering. This filtered output is coupled to the base electrode of an NPN voltage regulator transistor 59. A voltage limiting Zener diode 60 and a capacitor 61 are coupled across the emitter-collector electrodes of the transistor 59. The output of the transistor 59 appears at the points 68, 56. These points 68, 56 are coupled to a voltage output bridge 62 comprising four diode rectifiers. One corner of the voltage output bridge 62 is coupled to the center master bus 31, and the opposite corner 63 of the voltage output bridge 62 is coupled through a series circuit to the center slave bus 32. This series circuit includes a voltage regulator saturable reactor 64, and specifically a first winding 65. This first winding 65 is coupled to the point 67 which, as already described, is coupled through the voltage regulator resistor 41 to the center slave bus 32. The voltage regulator saturable reactor 64 also includes a second winding 66 which will be mentioned subsequently.

The current supplied by the output transformer secondary windings 22, 25 is indicated by a current transformer 70. This transformer 70 is coupled to a full wave current feedback bridge 71 which includes a resistor 74 and four diode rectifiers. The output of the current feedback bridge 71 appears at the points 72, 73. The point 73 is coupled through a resistor 75 and a current limiting Zener diode 76 to the control electrode of a silicon controlled rectifier 78. The point 72 is coupled to the cathode of the control rectifier 78. A resistor 77 is coupled between the control electrode and the cathode of the control rectifier 78. The anode of the rectifier 78 is coupled to a point 79, this point 79 being coupled to the direct current terminal B+ through a resistor 81 and a reset pushbutton 83. The cathode of the control rectifier 78 is coupled directly to the direct current terminal B—. A full wave shorting bridge 80 comprising four diode rectifiers is coupled between the anode and cathode of the control rectifier 78. The second winding 66 of the voltage regulator saturable reactor 64 is coupled between two corners of this shorting bridge 80. And finally, a resistor 82 is coupled between the point 79 and the direct current terminal B—.

*Regulator operation*

The operation of the regulator shown in FIGURE 1 will be described in connection with the waveforms shown in FIGURES 2a through 2g. These waveforms are plotted along a common time axis. However, before the actual operation is described in detail, the principle of operation will be described. The output voltage of the inverter circuit, as provided by the secondary windings 22, 25 of the output transformers 20, 23, is shown in FIGURE 2c. This output voltage is a quasi square wave which, if desired, may be applied to a filter to convert it into a sine wave having the same fundamental frequency as the quasi square wave. In fact, the quasi square wave shown may be reduced to a number of sine waves having the fundamental and odd harmonic frequencies of the quasi square wave. The quasi square wave output voltage has some time duration at zero voltage that is neither positive nor negative. If the time duration at zero were increased, then the fundamental sine wave desired from such a wave would have a lower amplitude. Conversely, if the time duration at zero were decreased (to the ultimate condition where the output voltage passed quickly through but did not stay at zero voltage so that the output voltage was a true square wave), then the fundamental sine wave would have a higher (or at the ultimate condition a maximum) amplitude. The invention controls or regulates the output voltage amplitude by changing this zero voltage time duration.

Figure 2:
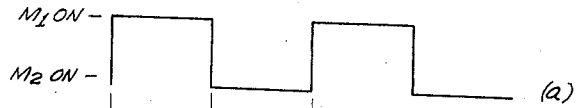
FIGURES 2a through 2g show waveforms for explaining the operation of the regulator of FIGURE 1.
Figure 2:
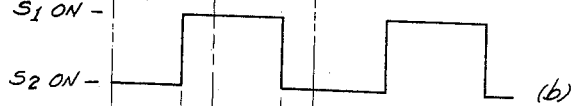
Figure 2:
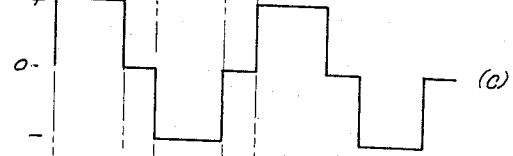
Figure 2:
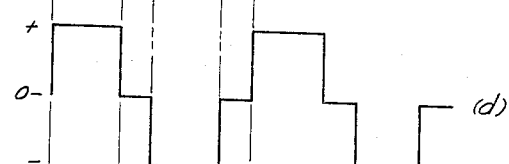
Figure 2:
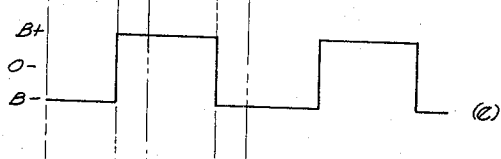
Figure 2:
Figure 2:
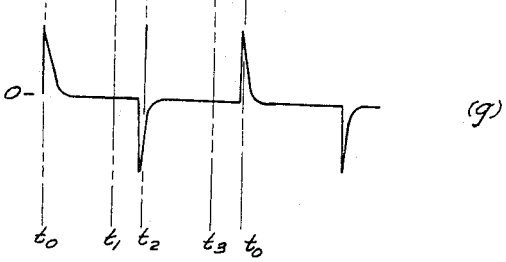

A typical cycle of operation is shown beginning at the time $t_0$ in FIGURE 2. As an example, it is assumed that the inverter is operating at 60 cycles. Thus, one cycle of operation (beginning at the time $t_0$ and ending at the next time $t_0$) occupies a time duration of 1/60 of a second. As indicated in FIGURE 2a at the time $t_0$, the master transistors M1, M2 have been switched by the oscillator so that the master transistor M2 has just been switched off or has just become nonconducting, and the master transistor M1 has just been switched on or has just started to conduct. As indicated in FIGURE 2b at this time $t_0$, the slave transistor S1 is cut off or nonconducting and the slave transistor S2 is conducting. Under these conditions, current may flow from the direct current terminal B+ through the master transistor M1 to the center master bus 31, through the primary winding 21 of the output transformer 20 to the center bus 30, through the primary winding 24 of the output transformer 23 to the center slave bus 32, and through the slave transistor S2 to the direct current terminal B—. This produces the arbitrarily designated positive output voltage shown in FIGURE 2c at the time $t_0$. It will be seen that the center master bus 31 is therefore positive with respect to the center bus 30, and that the center bus 30 is positive with respect to the center slave bus 32. This causes an exciting current to flow from the center master bus 31 through the upper left diode rectifier of the voltage output bridge 62 to the point 68, through the transistor 59 to the point 56, through the lower right diode rectifier of the voltage output bridge 62 to the point 63, through the first winding 65 of the voltage regulator saturable reactor 64 to the point 67, and through the voltage regulator resistor 41 to the center slave bus 32. A voltage appears across the first winding 65. This voltage has a magnitude which is determined in part by the voltage between the center master bus 31 and the point 63. This voltage, in turn, is controlled by the voltage on the base electrode of the voltage regulator transistor 59. The voltage on the base electrode of the voltage regulator transistor 59 is a direct current voltage of a magnitude proportional to the average output voltage of the output transformers 20, 23. An appreciable positive voltage is developed across the first winding 65 (point 63 to point 67) as indicated by FIGURE 2d at time $t_0$. And, with the current flow in the direction just described, the point 63 is positive with respect to the point 67. Also at the time $t_0$, the voltage on the primary winding 38 (point 67 to bus 30) of the voltage regulator transformer 37 has a negative value that is almost B— as indicated in FIGURE 2e. The voltage on the regulator resistor 41 (point 67 to bus 32) has a small positive value indicated in FIGURE 2f. And FIGURE 2g shows a positive pulse of voltage supplied to the primary winding 27 (point 35 to bus 30) of the pulse transformer 26.

The exciting current through the path described in the previous paragraph continues to flow through the first winding 65 of the voltage regulator saturable reactor 64. Depending upon the magnitude of the voltage across the first winding 65, the reactor 64 will, at some arbitrary time designated $t_1$ in FIGURE 2, become saturated. When this occurs, the voltage across the first winding 65 of the voltage regulator saturable reactor 64 reduces or falls substantially to zero as shown in FIGURE 2d. This then permits a relatively large current to flow from the center master bus 31 through the voltage output bridge 62 and its associated circuitry to the point 63, through the first winding 65 of the voltage regulator saturable reactor 64 to the point 67, and through the regulator resistor 41 to the center plane bus 32. This pulls the point 67 to a relatively high positive voltage (substantially to B+) with respect to the center slave bus 32 as indicated in FIGURE 2f which shows the voltage across the regulator resistor 41. This current also causes the voltage across the primary winding 38 of the regulator transformer 37 to have a polarity such that the point 67 becomes poistive with respect to the center bus 30 as shown in FIGURE 2e. The dotted end of the primary winding 38 of the voltage regulator transformer 37 is therefore positive with respect to the undotted end. This polarity thus causes the slave transistors S1, S2 to switch states so that the slave transistor S1 conducts and the slave transistor S2 becomes nonconducting. This is indicated in FIGURE 2b. It will thus be seen that at this time $t_1$, the master transistor M1 and the slave transistor S1 are both conducting and that the master transistor M2 and the slave transistor S2 are both nonconducting. The center master bus 31 and the center slave bus 32 are therefore both at the same potential so that no output voltage is produced. This is indicated in FIGURE 2c. And finally, when the slave transistor S1 is conducting, this pulls the center slave bus 32 up to the voltage of the terminal B+. This causes the voltage on the voltage regulator resistor 41 to reverse polarity because the center slave bus 32 is now positive with respect to the point 67. Thus, FIGURE 2f for the voltage on the regulator resistor 41 becomes negative as indicated at some time slightly after the time $t_1$.

The circuit remains in this condition until the time $t_2$ when the oscillator causes the master transistor M1 to stop conducting and the master transistor M2 to begin conducting as shown in FIGURE 2a. Under these conditions, the slave transistor S1 is conducting and the master transistor M2 is conducting so that current flows from the terminal B+ through the slave transistor S1, from the center slave bus 32 through the primary winding 24 of the output transformer 23 to the center bus 30, through the primary winding 21 of the output transformer 20 to the center master bus 31, and through the master transistor M2 to the terminal B—. This causes the output voltage to reverse polarity and assume an arbitrarily designated negative voltage as shown in FIGURE 2c. This also causes a negative pulse to be applied on the primary winding 27 of the pulse transformer 26 since the center bus 30 is now positive with respect to the center master bus 31. This is shown in FIGURE 2g. With the center slave bus 32 positive with respect to the center master bus 21, current flows through the path previously mentioned, but in the opposite direction. That is, current flows from the center slave bus 32 through the voltage regulator resistor 41 to the point 67, through the first winding 65 of the voltage regulator saturable reactor 64 to the point 63, through the upper right diode rectifier of the voltage output bridge 62 to the point 68, through the voltage regulator transistor 59 to the point 56, through the lower left diode rectifier of the voltage output bridge 62 to the center master bus 31. This current is limited to an exciting current value because of the voltage regulator saturable reactor 64. As mentioned previously, the voltage across the first winding 65 is determined in part by the voltage applied to the base of the voltage regulator transistor 59. The voltages across the first winding 65 and across the voltage regulator resistor 41 because of this current are shown in FIGURES 2d and 2f at the time $t_2$.

At the time $t_3$ in FIGURE 2, this time $t_3$ being substantially the same with respect to the time $t_2$ as the time $t_1$ is with respect to the time $t_0$, the voltage regulator saturable reactor 64 becomes saturated. The voltage across the first winding falls substantially to zero as indicated in FIGURE 2d. This then permits a relatively large current to flow so that considerable voltage is developed across the voltage regulator resistor 41. This is shown in FIGURE 2f by the negative excursion of point 67 to B—. This transition in voltage causes the dotted end (connected to the point 67) of the primary winding 38 of the voltage regulator transformer 37 to become negative with respect to the undotted end (connected to the bus 30) as shown in FIGURE 2e. This voltage is coupled to the secondary windings 39, 40 in such a manner as to cause the slave transistor S1 to become nonconducting and to cause the slave transistor S2 to become conducting. This is shown in FIGURE 2b. At this point, the master transistor M2 is conducting and the slave transistor S2 is conducting so that the center master bus 31 and the center slave bus 32 are at the same potential. Therefore, no output voltage is produced, this being shown in FIGURE 2c. When the slave transistor S2 is conducting, the center slave bus 32 is down at the voltage of the terminal B— which is negative with respect to the point 67. The voltage on the regulator resistor 41 becomes positive at some time slightly after the time $t_3$ as shown in FIGURE 2f. The circuit then remains in this condition until the time $t_0$, at which time the oscillator causes the master transistor M1 to conduct and causes the master transistor M2 to become nonconducting. At this time, the cycle repeats itself as described above with reference to FIGURE 2 beginning at the time $t_0$.

It will be seen that the master transistors M1, M2 are switched by the oscillator, and that the slave transistors S1, S2 are switched at a time determined by the time required for the voltage regulator saturable reactor 60 to become saturated so that sufficient current can flow to cause the voltage regulator transformer 37 to switch the slave transistors S1, S2. During operation, the transistors switch in the following sequence: the slave transistor S1 is rendered conducting sometime after the master transistor M1 begins to conduct, followed by the master transistor M2 being rendered conductive and the master transistor M1 being rendered nonconductive. This, in turn, is followed by the slave transistor S2 being rendered conductive. Subsequently, the master transistors are switched so that the master transistor M1 is conducting. This is followed by the switching of the slave transistors so that the slave transistor S1 is conducting. The switching time of the master transistors M1, M2 is determined by the oscillator frequency. The switching of the slave transistors S1, S2 is determined by the time required to saturate the voltage regulator saturable reactor 64. This time is actually determined by the volt-second characteristics of the voltage regulator saturable reactor 64. The voltage applied to the first winding 65 of this reactor 64 is determined in part by the voltage drop across the voltage regulator transistor 59. This voltage drop across the transistor 59 is, in turn, determined by the output voltage supplied by the secondary windings 22, 25 of the output transformers 20, 23. It will be seen that this output voltage, or some portion of this output voltage, is selected by the tap 50 on the voltage level potentiometer 49. This voltage is applied through a feedback saturable reactor 51 to the voltage feedback bridge 54 where it is rectified and filtered and supplied to the base electrode of the voltage regulator transistor 59. This voltage on the base electrode represents the magnitude of the voltage supplied by the secondary windings 22, 25 of the output transformers 20, 23, less a reference voltage supplied by the reactor 51. If this voltage increases, the voltage drop across the voltage regulator transistor 59 decreases so that a greater volt-second signal is applied to the first winding 65 of the voltage regulator saturable reactor 64. The reactor 64 therefore saturates earlier. This causes the slave transistors S1, S2 to switch earlier, the effect of this earlier switching being to reduce the output voltage or to cause the output voltage to return to zero sooner. This return to zero at a sooner time reduces the output voltage magnitude. Conversely, if the voltage applied to the base electrode of the voltage regulator transistor 59 decreases so that the voltage drop across the transistor 59 increases, the volt-second signal applied to the first winding 65 of the reactor 64 decreases. The reactor 64 therefore saturates later. This causes the slave transistors S1, S2 to switch later, the effect of the later switching being to reduce the output voltage to zero at a later time. This causes the magnitude of the output voltage to increase. It will thus be seen that the circuit operation is a stable one in which an increased output voltage causes earlier switching of the slave transistors with a resultant decreased output voltage, and a decreased output voltage causes a later switching of the slave transistors with a resultant increased output voltage.

With reference to FIGURE 2g, the primary winding 27 of the pulse transformer 26 receives positive and negative pulses at the same time that the master transistors M1, M2 are switched. These pulses are coupled to the secondary windings 28, 29 of the pulse transformer 26 to insure that the slave transistors S1, S2 are actually switched after the master transistors M1, M2 are switched even if the reactor 64 does not saturate. For example, in FIGURE 2g at the time $t_2$, the point 35 goes negative with respect to the center bus 30. This point 35 is coupled to the dotted end of the primary winding 27 of the pulse transformer 26 and is capable of causing the slave transistor S1 to become conducting and the slave transistor S2 to become nonconducting. This would switch the slave transistors S1, S2 if they had not switched at the time $t_1$. If the slave transistors S1, S2 have switched, then the pulse transformer 26 has no effect. The pulse transformer 26 merely insures that the slave transistors S1, S2 switch states even if a signal is not received from the voltage regulator transformer 37. This is desirable because at least one, and possibly more, half cycles of slave transistor switching would be lost, with resultant lost output voltage.

When the inverter is operating, the load may provide an overcurrent or short circuit condition with consequent overloading on the inverter transistors. The transistors may not be capable of supplying this current demand, and if appropriate action is not taken, the transistors may be damaged. The invention provides current limiting to protect the inverter in the event of such an occurrence. The current limiting is provided by the current transformer 70, the current feedback bridge 71, the associated circuit with the feedback bridge 71, the control rectifier 78, the shorting bridge 80, and the second winding 66 on the voltage regulator saturable reactor 64. If the output current exceeds a predetermined magnitude, the current feedback bridge 71 produces sufficiently positive voltage to overcome the voltage drop across the current limit Zener diode 76. This positive voltage is applied to the gate electrode of the control rectifier 78 and causes the control rectifier 78 to fire or conduct. When the control rectifier 78 conducts, the second winding 66 is short circuited through a path including the upper left diode rectifier of the shorting bridge 80, the anode-cathode path of the control rectifier 78, and the lower right diode rectifier of the bridge 80; and a path including the upper right diode rectifier of the bridge 80, the anode-cathode path of the control rectifier 78, and the lower left diode rectifier of the bridge 80. Thus, whenever the control rectifier 78 conducts, the second winding 66 of the voltage regulator saturable reactor 64 is short circuited. With this second winding 66 short circuited, the first winding 65 of the voltage regulator saturable reactor 64 likewise appears short circuited. Thus, the voltage regulator saturable reactor 64 appears saturated so that full saturation current may flow through the first winding 65 in either direction as soon as applied. Thus, no time delay is introduced and the slave transistors S1, S2 are immediately switched following the switching of the master transistors M1, M2. Thus, with reference to FIGURE 2c, the slave transistors S1, S2 would be switched so that the output voltage would return from a positive value to zero immediately, or shortly after the time $t_0$ and remain at zero until the time $t_2$. Immediately or shortly after the time $t_2$, the slave transistors would be switched so that the output voltage is again reduced to zero from a negative value. Once the control rectifier 78 conducts, it continues to conduct even though the positive voltage is removed from the gate electrode of the control rectifier 78. So the second winding 66 remains short circuited even though the high current condition may have been removed. The control rectifier 78 may be turned off, so as to remove the short circuit from the second winding 66, by interrupting the anode-cathode voltage. This is achieved by the pushbutton 83 being operated to open the circuit between the terminal B+ and the anode of the control rectifier 78. The pushbutton 83 may be manually operated or may be automatically operated by suitable relays which, if desired, can be operated at intervals until the overcurrent or short circuit condition is cleared. With the quick reduction of the output voltage to zero after each switching of the master transistors, the output current would be reduced to almost zero also. And this reduction of output voltage to substantially zero would take place regardless or irrespective of the voltage regulator circuit. With a low output voltage, the voltage regulator would otherwise be attempting to delay switching of the slave transistors S1, S2 to an appreciable time after switching of the master transistors M1, M2. However, the voltage regulator would be superseded by the operation of the current limiter so that the transistors would be protected against overloads or short circuit conditions.

In summary, the voltage regulator of the invention provides regulation or limiting of the output voltage to a predetermined amplitude by means of the volt-second characteristics of the voltage regulator saturable reactor 64. Likewise, the current is limited by a circuit which short circuits the voltage regulator saturable reactor 64.

Feedback saturable reactor

The voltage regulator of the invention utilizes the feedback saturable reactor 51 to provide a feedback or error voltage. This feedback voltage is provided by a comparison of an inherent reference voltage within the reactor 51 with a portion of the output voltage at the tap 50 on the voltage level potentiometer 49. The inherent reference voltage is provided by the volt-second characteristics of the reactor 51. The inverter output voltage is applied to the primary winding 52 of the reactor 51. The feedback voltage appears across the secondary winding 53 of the reactor 51. As already explained, the voltage across the secondary winding 53 is rectified by the voltage feedback bridge 54 and supplied as a direct current signal to the base electrode of the voltage regulator transistor 59 to control the exciting current for the voltage regulator saturable reactor 64. FIGURES 3a, 3b, and 3c show details of the construction and arrangement of the feedback saturable reactor 51. FIGURE 3a shows a top view of the feedback saturable reactor 51, FIGURE 3b shows a front view of the reactor 51, and FIGURE 3c shows a view of the left end of the saturable reactor 51. As shown in FIGURES 3a and 3c, the reactor 51 preferably comprises 25 similar laminations of suitable saturable magnetic material such as Orthonol, a product trade name of Magnetics, Inc., Butler, Pennsylvania. These laminations are generally U-shaped, and have a thickness of 0.01 inch (which is greatly exaggerated in FIGURES 3a and 3c), a length 1¾ inches, and a width of ⅞ inch. These and other dimensions are shown in FIGURE 3b. The laminations are numbered in FIGURE 3c. An input core or magnetic path comprising leg 1, leg 2, and two portions 90 is formed of 22 laminations. Eighteen of these laminations are stacked together in alternate fashion as indicated in FIGURE 3c. That is, these 18 laminations are stacked with the odd number laminations having the base (of their U shape) positioned on the left, as viewed in FIGURE 3b, and with the even number laminations having the base (of their U shape) positioned on the right, as viewed in FIGURE 3b. The next four laminations are stacked the same way relative to each other with the base (of their U shape) positioned on the left, as viewed in FIGURE 3b. Leg 1 and the portions 90 (between leg 1 and leg 2) have substantially equal amounts of magnetic material (and hence substantially equal magnetic reluctance) because half of leg 1 has air space, the portions 90 are all magnetic material and the cross-sectional area of leg 1 is twice the cross-sectional area of each of the portions 90. Because the last four laminations of the 22 laminations are stacked the same way with the base (or their U shape) on the left, leg 2 has the smallest amount of magnetic material (and hence the greatest magnetic reluctance). An output core or magnetic path comprising leg 3 and portions 91 is formed of three lamination having the base (of their U shape) positioned on the right. These three laminations are placed alongside or against the 22 laminations of the input core with the ends (of their U shape) across or in magnetic shunt with leg 2. The air gap or air space (with no magnetic material) between the ends of the U shape of the output core causes the output core to have a magnetic path of greater magnetic reluctance than the magnetic reluctance of leg 2. The input or primary winding 52 for the reactor 51 is wound on leg 1 (or may be more conveniently wound on a portion 90), and in the embodiment described includes approximately 7,320 turns of No. 38 wire. The output or secondary winding 53 is wound on leg 3 (or more conveniently on a portion 91), and includes approximately 2,086 turns of No. 38 wire. The entire structure of the laminations and windings is suitably enclosed or set in a potting material.

The feedback saturable reactor 51 described in connection with FIGURES 3a, 3b, and 3c provides a feedback device with a built-in reference voltage or signal which is provided by the magnetic characteristics of the reactor, and specifically leg 1. These characteristics are such that when a voltage is applied to the primary winding 52, no voltage appears at the secondary winding 53 until the input core including leg 1 and leg 2 becomes saturated. As mentioned above, the cross-sectional area of leg 2 has the least amount of magnetic material in it. Therefore, the cross-sectional area or magnetic reluctance of leg 2 is the determining factor as to when the input core of the reactor becomes saturated. When this input core, and specifically leg 2, does become saturated, then magnetic flux may travel around the path of the output core including leg 3. When magnetic flux does travel around the path of the output core including leg 3, the secondary winding 53 produces a signal. Thus, the feedback saturable reactor 51 provides an output signal at the secondary winding 53 after the input core leg 2 becomes saturated. Thus, leg 2 provides a volt-second reference level. When this level is exceeded by the volt-second characteristics of the input signal applied to the primary winding 52, the secondary winding 53 produces an output signal. Thus the saturable reactor 51 has an inherent or included reference, namely the volt-second saturation characteristics of leg 2. Although the saturable reactor 51 has been described in terms of a specific embodiment, it will be appreciated that different core configurations, different materials, and different constructions can be used. The arrangement shown and described in connection with FIGURES 3a, 3b, and 3c is by way of example only.

The operation of the saturable reactor of FIGURES 3a, 3b, and 3c is described in connection with FIGURES 4 and 5 which represent a steady-state condition. FIGURE 4 shows a waveform of the output voltage which might be applied to the primary winding 52 of the feedback saturable reactor 51 by the inverter of FIGURE 1. FIGURE 5 shows hysteresis loops for leg 1, leg 2, and leg 3 of the feedback saturable reactor 51. Leg 1 is shown by the solid line hysteresis loop, leg 2 is shown by the dashed line hysteresis loop, and leg 3 is shown by the dashed and dotted line hysteresis loop. Points in time on the output voltage waveform are indicated by the letters A, B, C, D, E, and F. Corresponding points on the hysteresis loops are indicated by the same letters with a suffix numeral indicating the particular leg. At the point A in FIGURE 4, the voltage has risen only slightly above zero in a positive direction, so that the three hysteresis loops are still at a negative flux level as indicated by the points A1, A2, and A3. In FIGURE 4, point B is the point at which leg 2 is assumed to become saturated. (With reference to FIGURE 1, this is the point at which the output voltage would be supplied by the secondary winding 53 to the voltage feedback bridge 54 to begin the switching of the slave transistors S1, S2.) The positive flux level saturation of leg 2 is indicated by the point B2. Leg 1 has a positive flux level indicated by the point B1, the point B1 being below the point B2 by an amount equal to the negative flux level in leg 3 as indicated by the point B3. During the interval from the point B to the point C (zero) in FIGURE 4, the secondary winding 53 of the feedback saturable reactor 51 produces a voltage. At the point C, leg 1 has a positive flux level indicated by the point C1 (which is less than its flux saturation level), and leg 2 still has its positive saturation flux level indicated by the point C2. Leg 3 now has a positive flux level indicated by the point C3. Again, it will be noted that the sum of the flux levels of legs 2 and 3, as indicated by the points C2 and C3, equals the flux level of leg 1, as indicated by the point C1. Nothing further happens in the saturable reactor while the output voltage remains at the zero level of point C. However, at point D, the current in the primary winding 53 has just reversed and is slightly negative. This is indicated by the point D1 for leg 1, the point D2 for leg 2, and the point D3 for leg 3. In the interval between the points D and E in FIGURE 4, no output is produced by the secondary winding 53 of the feedback saturable reactor 51. However, when leg 2 becomes saturated at the point E, the secondary winding 53 can and does produce an output signal. The negative saturation flux level of leg 2 is indicated by the point E2. At this time, leg 1 has a flux level indicated by the point E1, and leg 3 has a flux level indicated by the point E3. Again, it will be seen that the sum of the positive flux level of leg 3 and the negative flux level of leg 2 equals the flux level in leg 1. From the time between points E and F the secondary winding 53 produces an output signal. At the point F, the output voltage returns to zero. At this point, leg 1 has a flux level indicated by the point F1, leg 2 still has its negative saturation flux level indicated by the point F2, and leg 3 now has a negative flux level indicated by the point F3. Nothing further happens as long as the output voltage level remains zero. However, when the output voltage becomes positive again, the cycle or excursion on the hysteresis loops is repeated as described beginning at the points A1, A2, and A3. It will thus be seen that leg 1 and leg 3 never become fully saturated in the particular operation shown. This is the preferred operation. Leg 2 however does become saturated, and when it does, the secondary winding 53 produces an output signal. Thus, the feedback saturable reactor 51 includes an inherent reference, this reference being determined by the volt-second characteristics of leg 2. Other configurations can also be utilized and still provide the operation described.

*Conclusion*

It will be seen that the invention provides an improved voltage regulator and an improved current limiter for particular use with static inverters. Further, the invention provides an improved feedback and reference comparison arrangement in the form of a saturable reactor. While the invention has been described in a particular form and embodiment, other arrangements can be used. For example, in FIGURE 1, a conventional feedback arrangement including an actual source of reference voltage and comparison circuit can be used in place of the feedback saturable reactor 51. And, in the saturable reactor shown in FIGURES 3a, 3b, and 3c, other core configurations and winding arrangements can also be used. Further, some degree of adjustment can be provided for the saturation point of leg 2. However, these and other modifications will be apparent to persons skilled in the art. Therefore, while the invention has been described with reference to particular embodiments, it is to be understood that modifications may be made without departing from the spirit of the invention or from the scope of the claims.

What I claim as new and desire to secure by Letters Patent of the United States is:

1. In an inverter wherein switch devices are switched between conducting and nonconducting states to convert a source of direct current to alternating current, a voltage regulator comprising gating means coupled to selected ones of said switch devices for switching said devices between conducting and nonconducting states, a saturable reactor having a single winding, sensing means coupled to said alternating current to sense the voltage amplitude thereof, control means serially coupling the winding of said saturable reactor across the output of said inverter, said control means being responsive to said sensing means to control the voltage across said winding in accordance with the deviation of the voltage amplitude of said alternating current from a preselected level, and means coupling said winding to said gating means so that a switching signal is produced by said gating means when said saturable reactor is saturated.

2. In an inverter wherein switch devices are switched between conducting and nonconducting states to convert a source of direct current to alternating current, a current limit comprising gating means coupled to selected ones of said switch devices for switching said devices between conducting and nonconducting states, a saturable reactor having a first winding and a second winding, control means coupling said first winding between the output of said inverter and said gating means and controlling the voltage across said first winding so that a gating signal is delivered to said gating means by said first winding whenever the impedance of said first winding is substantially reduced, current sensing means coupled to said alternating current to sense the current magnitude thereof, and switch means coupled across the second winding of said saturable reactor to short circuit said second winding in response to the output of said current sensing means whenever the current magnitude of said alternating current exceeds a predetermined level, whereby the impedance of said first winding is substantially reduced.

3. In an inverter wherein switch devices are switched between conducting and nonconducting states to convert a source of direct current to alternating current, a voltage regulator and current limit comprising gating means coupled to selected ones of said switch devices for switching said devices between conducting and nonconducting states, a saturable reactor having a first winding and a second winding, first sensing means coupled to said alternating current to sense the voltage amplitude thereof, control means coupling the first winding of said saturable reactor between the output of said inverter and said gating means so that a gating signal is applied to said gating means by said first winding whenever the impedance of said first winding is substantially reduced, said control means regulating the voltage across said first winding in response to the output of said first sensing means thereby controlling the time at which said saturable reactor saturates and the impedance of said first winding is accordingly substantially reduced, second sensing means coupled to said alternating current to sense the current magnitude thereof, switch means coupled across the second winding of said saturable reactor to short circuit said second winding in response to the output of said second sensing means whenever the current magnitude of said alternating current exceeds a predetermined level, whereby the impedance of said first winding is quickly substantially reduced.

References Cited

UNITED STATES PATENTS 3,248,637  4/1966  Albert et al. _____ 321—18
3,247,447  4/1966  Flairty et al. _____ 321—14
3,109,133  10/1966 Mills _____ 321—45 X JOHN F. COUCH, *Primary Examiner.*

M. L. WACHTELL, *Assistant Examiner.*